United States Patent
Gee, Jr.

(10) Patent No.: US 7,024,683 B1
(45) Date of Patent: Apr. 4, 2006

(54) SYSTEM AND METHOD FOR ADAPTIVELY INTERFACING DIFFERENT POD MODULES TO A NAVIGATION DEVICE

(75) Inventor: James D. Gee, Jr., Trenton, GA (US)

(73) Assignee: IP Co., LLC, Ossining, NY (US)

( * ) Notice: Subject to any disclaimer, the term of this patent is extended or adjusted under 35 U.S.C. 154(b) by 458 days.

(21) Appl. No.: 09/702,687

(22) Filed: Nov. 1, 2000

(51) Int. Cl.
*H04N 7/173* (2006.01)
*H04N 7/16* (2006.01)
*H04N 5/44* (2006.01)

(52) U.S. Cl. .............. 725/132; 725/140; 725/152; 348/725

(58) Field of Classification Search ............ 725/25, 725/31, 68, 141, 142, 153, 133, 131, 134; 348/725; 340/7.54; 439/955; 235/375, 235/380; 380/211; 705/55, 65; 713/172, 713/173, 174
See application file for complete search history.

(56) References Cited

OTHER PUBLICATIONS

Society of Cable Telecommunications Engineers, Inc., Proposed HOST-POD Interface Specification, Jan. 7, 2000, SCTE DVS/295, pp. 14-18 and 34.*

* cited by examiner

*Primary Examiner*—Vivek Srivastava
*Assistant Examiner*—Joseph G. Ustaris
(74) *Attorney, Agent, or Firm*—Collen IP; Donald J. Ranft (57) ABSTRACT

A method, system, and computer program product for adapting a navigation device to 5 operate with a plurality of different point of deployment (POD) modules that provide conditional access to video programming. A POD type for a POD module that is interfaced with the multichannel video receiver is first determined, and interface parameters for the POD type are subsequently determined. The multichannel video receiver is then adapted to provide the interface parameters to the POD module interfaced with the multichannel video 10 receiver. The POD type may be determined automatically by the multichannel video receiver, or by prompting a user of the multichannel video receiver to determine and input the POD type for the POD module inteffaced with the multichannel video receiver. The POD type may be achieved by automatically receiving a type message from the POD module video receiver, and displaying an on-screen message on video monitor.

19 Claims, 7 Drawing Sheets

2
SYSTEM AND METHOD FOR ADAPTIVELY INTERFACING DIFFERENT POD MODULES TO A NAVIGATION DEVICE

BACKGROUND OF THE INVENTION

1. Field of the Invention

The present invention relates generally to a system and method for providing adaptability of multichannel video receiving equipment to a plurality of conditional access security units, and more specifically to a system and method for providing a navigation device with the ability to function with a plurality of different Point of Deployment (POD) modules which provide a security function for cable television programming.

2. Discussion of the Background

As any cable television subscriber knows, receiving the full selection of cable programming requires the use of a cable set-top box obtained from the local cable television provider. These set-top boxes include functional features that allow the cable television subscriber to, among other things, receive a cable signal from the provider, output audio and video from the set-top box to a television set, and select programs for viewing. In addition, the set top box includes a security feature that allows the cable provider to prevent unauthorized subscribers from viewing conditional access programs such as pay-per-view and premium programming.

Traditionally, cable operators have provided subscribers with set top boxes that include both the functional features as well as the security or conditional access feature embedded in an integral unit. As conditional access systems vary among regional cable operators, cable television subscribers have been forced to lease set-top boxes from their local cable provider rather than purchase a set-top box which may not work if the subscriber switched cable providers. The only circumstance in which a subscriber could own and use his or her own cable television equipment is where the subscriber only received "basic" programming which was not subject to conditional access functionality. Moreover, since cable provider specific set-top boxes generally serve a small regional market of consumers, national consumer electronics manufacturers have generally been unwilling to enter the set-top box market thereby impeding the development of high tech cable boxes that are expected to be the gateway to a host of services in coming years including high speed Internet links, on demand movies, and interactive television.

In an effort to promote interoperability of set top boxes among cable providers and attract more competition into the cable box market, the FCC recently adopted rules which require cable providers to make available a separate security module known as a point of deployment (POD) module to their subscribers who may then purchase a generic "navigation device" which includes only the functional features of traditional set-top boxes. A navigation device is a generic term used by the FCC rules when referring to set top boxes and other equipment used to receive multichannel video such as cable television programming and other cable services provided by cable operators and other multichannel video providers. Thus, the FCC rules attempt to allow cable subscribers to purchase a generic navigation device from a manufacturer, retailer, or other vendor not affiliated with the cable provider, and obtain only the POD security module from the cable provider. Moreover, if the subscriber changes cable providers for any reason, a different POD module could be obtained from the new provider that would work in the generic navigation device.

Despite efforts of industry groups to develop a standard specification that would ensure this level of compatibility between the POD modules and navigation devices, however, there remains a strong incentive for POD manufacturers to produce POD modules that are compatible only with a specific navigation device. Indeed, traditional set-top box manufacturers have already begun to manufacture POD modules that will only operate in their own generic navigation devices thereby essentially forcing cable providers to deploy the POD and navigation device to subscribers as a set, and preventing interoperability of navigation devices among cable providers that deploy different PODs.

SUMMARY OF THE INVENTION

Accordingly, one object of this invention is to provide consumers of multichannel video programming with interoperability of a navigation device among different cable providers deploying different POD devices and continued functionality when the current provider chooses to deploy a different POD module.

Another object of the present invention is to provide cable providers with the option of purchasing POD devices from a variety of POD manufacturers and to change the POD device deployed to subscribers without changing navigation devices deployed.

These and other objects are achieved by providing a novel method, system, and computer program product for adapting a multichannel video receiver to operate with a plurality of different point of deployment (POD) modules that provide conditional access to video programming. The method, on which the system and computer program product are based, includes the steps of determining a POD type for a POD module that is interfaced with the multichannel video receiver, determining interface parameters for the POD type determined, and adapting the multichannel video receiver to provide the interface parameters to the POD module interfaced with the multichannel video receiver. The POD type may be determined automatically by the multichannel video receiver, or by prompting a user of the multichannel video receiver to determine and input the POD type for the POD module interfaced with the multichannel video receiver. Automatically detecting the POD type may be achieved by automatically receiving a type message from the POD module when the POD module is interfaced with the multichannel video receiver, and prompting may be achieved by displaying an on-screen message on a video monitor associated with the multichannel video receiver.

According to one aspect of the present invention, interface parameters for the POD type determined are a voltage level input required by the POD type, in which case the step of adapting the multichannel video receiver to provide the interface parameters to the POD module includes providing the voltage level input to the POD module interfaced with the multichannel video receiver. In another aspect, the interface parameter determined is pin positions of different interface signals required by the POD type, in which case the step of adapting the multichannel video receiver to provide the interface parameters to the POD module comprises providing the interface signals to pin positions of the POD module interfaced with the multichannel video receiver, the pin positions of the POD module corresponding to the pin positions required by the POD type. In this aspect, the interface signals comprise a video in, a voltage in, and a ground in from the multichannel video receiver, and a video out from the POD module.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
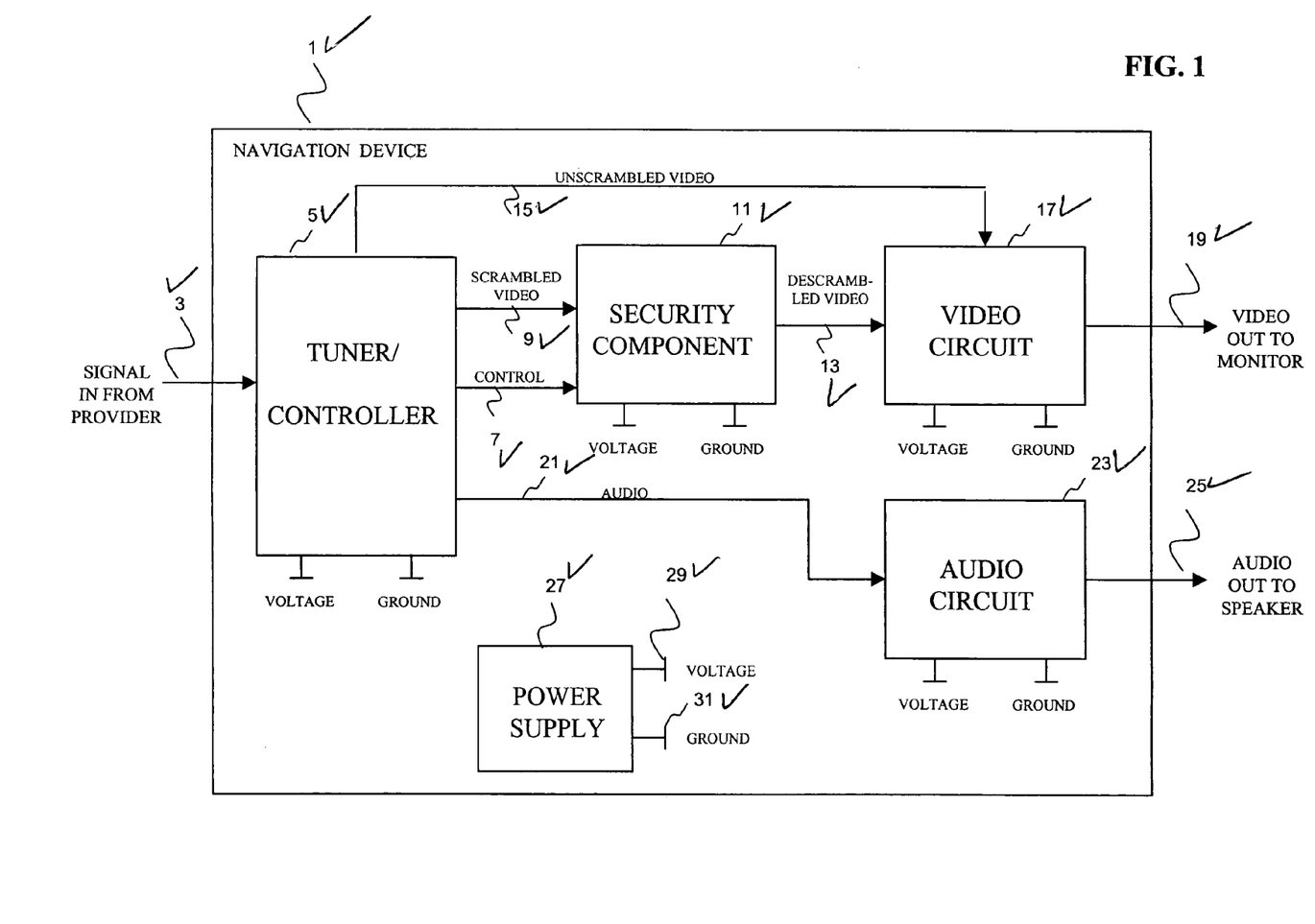
FIG. 1 is a block diagram of a navigation device including a security component in accordance with an embodiment of the present invention.

Referring now to the drawings, wherein like reference numerals designate identical or corresponding parts throughout the several views, and more particularly to FIG. 1 thereof, there is shown a block diagram of a navigation device including a security component in accordance with an embodiment of the present invention. The navigation device 1 includes signal input line 3 connected to tuner/controller 5 which has output connections to control line 7, scrambled video line 9, unscrambled video line 15, and audio line 21. The scrambled video line 9 is connected as an input to the security component 11 which feeds a descrambled video line 13. The de-scrambled video line 13 from the security component, and the unscrambled video line 15 from the tuner/controller are input connected to video circuit 17 which includes an output connected to video out line 19. In addition, audio line 21 from the tuner/controller 5 is input connected to audio circuit 23 which includes an output connected to audio out line 25. A power supply 27 supplies a voltage 29 and ground 31 to the tuner/controller 5, security component 11, video circuit 17, and audio circuit 23 of the navigation device 1.

Signal input line 3 inputs a multichannel video signal provided by a multichannel video provider such as a cable television programming provider. The input signal includes an analog video signal and/or digital video signal such as an MPEG digital video signal, modulated by a carrier signal, and may also include digital data related to program content and interactive applications. Moreover, the input signal from a cable provider includes unscrambled signals which provide programs viewable to all subscribers, as well as scrambled signals which provide premium programming viewable only to authorized subscribers as will be discussed in more detail below. The signal input line 3 is preferably a coaxial cable connector, however, as is understood by one of ordinary skill in the art, the input line 3 may be any input suitable for carrying analog an/or digital information, such as a twisted pair or fiber optic cable.

Tuner/controller 5 functions as a receiver for receiving the input signal from input line 3, removing the carrier from the input signal, and in the case of digital signals, decoding the signal. The tuner/controller 5 separates the carrierless signal into audio and video components, and, according to a preferred embodiment, further separates the video component into scrambled and unscrambled or "in the clear" video. Also included in the tuner/controller 5 is circuitry necessary for a user to interface with and issue commands to the navigation device 1, as well as logic circuitry for providing control signals to other circuits of the navigation device 1, and in particular to the security component 11. For example, tuner/controller 5 may include an infrared detector for receiving channel selection commands from a remote controller operated by the user. As another example, the infrared detector of the tuner/controller 5 may receive information relating to a type of POD module interfaced with the navigation device and may further generate a control signal that adapts the navigation device to the POD type entered as will be further discussed below. These functions may be performed by a processor and memory included in the tuner/controller 5.

Scrambled video output from the tuner/controller 5 is input to security component 11 via scrambled video line 9. As mentioned above, the scrambled video is the product of analog scrambling techniques or digital encryption techniques applied to premium programming signals delivered from the signal provider to ensure that only authorized subscribers can view the premium programs. As an example of analog scrambling techniques, signal providers may use various synchronization suppression techniques and/or video inversion techniques that require the user to have synchronization and inversion circuits in the navigation device. As an example of digital encryption, various MPEG video encryption algorithms are used which require the user to obtain a "key" that decrypts the video signal. For both the analog scrambled and digitally encrypted signals, the video signal delivered by the provider will appear garbled and unrecognizable on the subscribers screen unless the signal is first applied to descrambling or decrypting methods provided by security component 11. The security component may be adapted, in response to a control signal from the tuner/controller 5, to interface with a variety of different POD modules as will be described below.

Descrambled video from the security component 11 and unscrambled video from the tuner/controller 5 are sent to the video circuit 17 via descrambled video line 13 and unscrambled video line 15 respectively. The video circuit 17 includes circuitry for amplifying video signals as well as circuitry for performing tone, contrast, and color adjustments to the video signal. As is understood by one of ordinary skill in the art, video circuit 17 may also include various other video signal processing circuits performed under the control of the tuner/controller 5. For example, the video circuit may include picture-in-picture circuitry or circuitry for converting the video signal between computer monitor RGB (Red-Green-Blue) technology and television NTSC (National Television Standards Committee) technology so that the navigation device may feed video to either type of monitor. The video signal subjected to the amplification and processing of the video circuit 17 is output to a monitor via the video out line 19 which may be a twisted pair, RCA cable, s-video cable, fiberoptic cable, or any other line capable of carrying video signals to a monitor.

Audio circuit 23 receives the audio component of the provider's signal via audio line 21. The audio circuit 23 includes circuitry for amplifying the audio signal as well as audio signal processing circuitry such as volume, bass, and tone adjustments as well as other audio processing circuitry known to one of ordinary skill in the art. The audio signal subjected to the amplification and processing of the audio circuit 23 is output to a speaker system via the video out line 25 which may be a twisted pair cable, RCA cable, fiberoptic cable, or any other line capable of carrying an audio signal. In addition, the video output line 19 and the audio output line 25 may be combined in a coaxial cable.

Power supply 27 is any supply suitable for converting the AC power of a power gnd to a DC level suitable for the circuitry of the navigation device 1. As seen in FIG. 1, the power supply 27 provides a voltage output 29 and a ground output 31 for use in each of the circuits of the navigation device 1.

It is to be understood that the navigation device 1 in FIG. 1 is for exemplary purposes only, as many variations of the specific hardware and software used to implement the present invention will be readily apparent to one having ordinary skill in the art. For example, the functions of the navigation device 1 may be implemented or augmented by a processor system. To implement these variations as well as other variations, a single computer (e.g., the computer system 701 of FIG. 7) may be programmed to perform the special purpose functions the tuner/controller 5 shown in FIG. 1. On the other hard, two or more programmed computers may be substituted for the tuner/controller shown in FIG. 1.

Principles and advantages of distributed processing, such as redundancy and replication, may also be implemented as desired to increase the robustness and performance of the system, for example.

Figure 2:
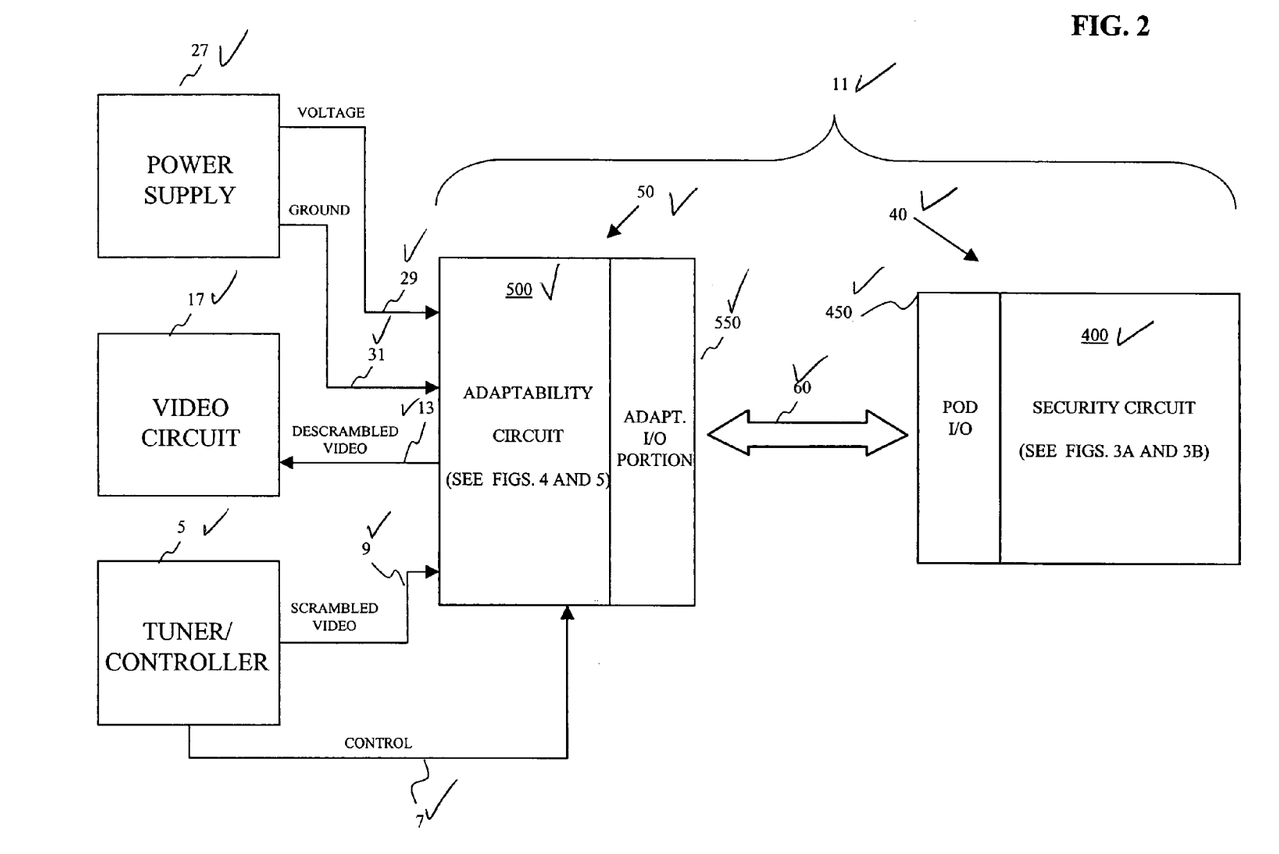
FIG. 2 is a block diagram showing the separate modules of the security component and how the modules interface with each of other and the navigation device in accordance with an embodiment of the present invention.

FIG. 2 is a block diagram of the separate modules of the security component 11 of FIG. 1 and how these modules interface with one another and the navigation device 1.

The security device 11 includes a POD module 40 that interfaces with an adaptability module 50 of the navigation device I by way of a physical interlace medium 60. The POD module includes security or conditional access circuitry 400 and a POD 110 (input/output) portion 450. The conditional access circuitry 400 inputs the scrambled video signal, voltage, and ground from the navigation device 1 via the POD 110 portion 450. The voltage and ground are applied to the security circuit 400 which then operates to descramble the scrambled video signal and output the descrambled video back to the navigation device I through the POD 110 portion 450. Thus, the POD module 40 has at least four interface signals which pass between the POD module 40 and the navigation device 1 via the POD 110 450: (1) voltage, (2) ground, (3) scrambled video, and (4) descrambled video.

The POD module 40 may be a stand alone unit in which case the POD I/O portion 450 is a plug or connector for mating with a multi-wire cable which carries the electrical interface signals between the navigation device 1 to the POD module 40. According to a preferred embodiment, however, the POD module 40 is a smart card having the security circuit 400 mounted thereon. In this embodiment, the security circuit 400 receives the interface signals form the navigation device 1 by way of card mounted conductive tabs that make direct contact with the navigation device 1 when the POD smart card is inserted into the navigation device.

Figure 3A:
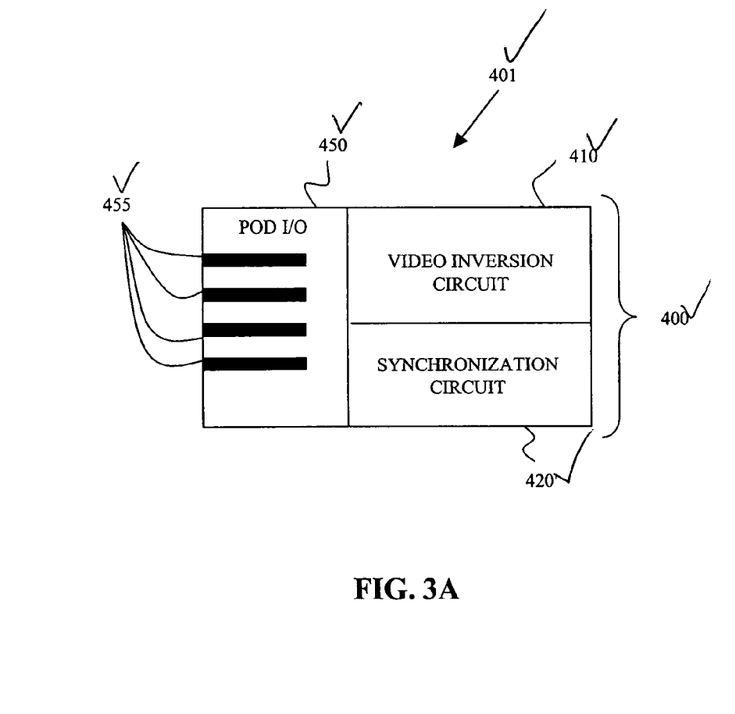
FIG. 3A is is an exemplary smart card type POD module used to descramble analog scrambled video in accordance with an embodiment of the present invention.
Figure 3B:
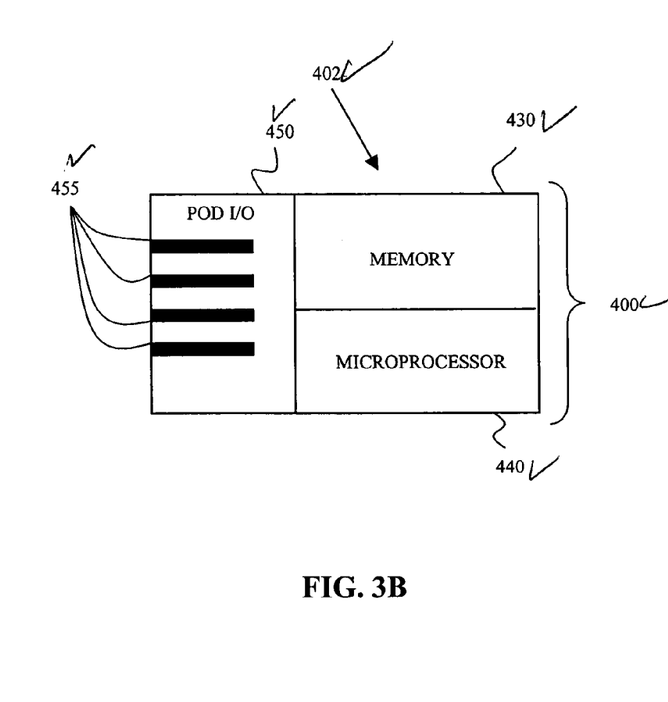
FIG. 3B is a an exemplary smart card type POD security module used to descramble digitally scramble video in accordance with an embodiment of the present invention.

As mentioned with respect to the description of FIG. 1 above, the multichannel video signal input to the navigation device 1 includes conditional access premium programming that is scrambled by analog and/or digital scrambling techniques that vary among signal providers such as cable television providers. Thus, the security circuitry 400 of POD module 40 provides a conditional access function by including the electrical components necessary for authorized subscribers to descramble the video signals sent by the provider. FIGS. 3A and 3B show exemplary smart card type POD devices used to descramble analog and digitally scrambled video signals respectively. The smart card POD devices are preferably PC card or other PCMCIA (personal computer memory card international association) card modules having an electronic circuitry area as well as a pin-out area.

Smart card POD module 401 of FIG. 3A includes video inversion circuit 410 and synchronization circuit 420 as the POD security circuitry 400. The synchronization circuit 420 is configured to replace or correct the horizontal and vertical synchronization signals suppressed as part of the proprietary scrambling technique used by the cable provider at the cable transmitting station. Similarly, the video inversion circuit 410 inverts the video signal in accordance with the proprietary video inversion pattern used as part of the scrambling techniques of the cable provider. The I/O portion 450 of the POD smart card 401 includes a plurality of electrical "pins" or contacts 455 which are electrically connected to the adaptability module 50 when the smart card is inserted into the navigation device 1. The electrical contacts 455 are preferably mounted on a single side along the periphery of the POD smart card 401 to simplify connection requirements for the navigation device 1, however, the electrical connections 455 may be configured in any known manner on POD smart card 401.

FIG. 3B shows a POD smart card module 402 configured to provide a security function for the navigation device 1 by descrambling digitally encrypted video signals sent from the cable provider. The POD smart card module 402 includes a memory 430 and a microprocessor 440 as the POD security circuitry 400. The memory 430 may be a static read only memory (ROM) which stores encryption keys issued by the cable provider when the subscriber obtains the smart card POD module 402, or dynamic random access memory (RAM) to which encryption keys may be written to and periodically updated by the cable provider. The encryption key provides the proprietary algorithm used by the microprocessor 440 to decrypt the scrambled video signal. As with the POD smart card 401 of FIG. 3A, the POD smart card 402 includes an I/O portion 450 which includes a plurality of electrical "pins" or contacts 455 that are electrically connected to the adaptability module 50 when the smart card is inserted into the navigation device 1.

Referring again to FIG. 2, the POD module 40 connects to adaptability module 50 of the navigation device 1 by way of physical interface medium 60. The adaptability module 50 includes an adaptability circuit 500 as well as an adaptability I/O portion 550. As with the POD I/O portion 450, the adaptability I/O portion 550 passes the interface signals between the navigation device 1 and the POD module 40. The adaptability I/O portion 550 is suitably configured to connect with the POD I/O portion 450 by way of the physical interface medium 60. For example, where the POD module 40 is a stand alone unit having a plug or connector that mates with a multi wire cable as the physical interface medium 60, the adaptability I/O portion 550 is also a plug or connector that mates with a multi wire cable. Similarly, where the POD I/O portion 450 is a smart card pin configuration and the physical interface medium 60 is a slide in smart card port, the adaptability I/O portion 550 an electrical socket suitably configured to receive a smart card. Thus, according to the present invention, the POD I/O portion 450, the interface medium 60, and the adaptability I/O portion 550 must be correspondingly configured in order for the POD module 40 to interface physically with the adaptability module 50 of the navigation device 1. As is understood by one of ordinary skill in the art, a variety of physical interfaces may be used.

The adaptability circuit 500 of the adaptability module 50, under the control of the tuner/controller 5, provides a suitable electrical interface for a plurality of different POD modules 40 that may be physically interfaces with the navigation device. As shown in FIG. 2, the adaptability circuit 500 is directly connected to the voltage line 29, ground line 31, descrambled video line 13, and scrambled video line 9 of the navigation device 1, and changes the interface parameters of these signal lines to match the interface parameters of a particular POD module 40 connected to the navigation device 1. The interface parameters may be a particular voltage level required by the POD module 40, a pin location requirement of the POD module 40, or a combination of these parameters. Moreover, as is understood to one of ordinary skill in the art, the interface parameters changeable by the adaptability circuit 500 may be any electrical characteristic that is variable among different POD modules having the four interface signals listed above.

Figure 4:
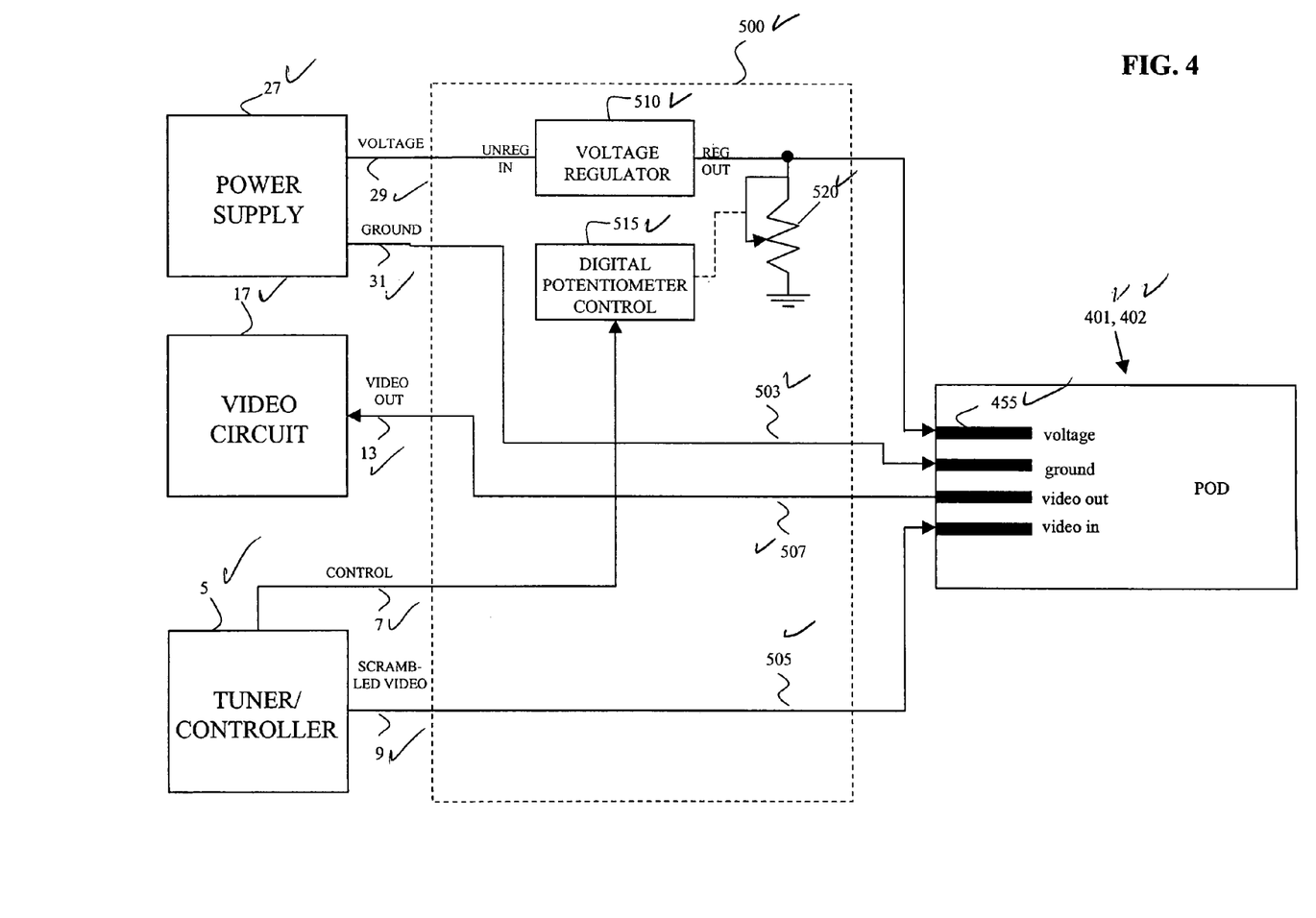
FIG. 4 shows an adaptability circuit that adapts the voltage interface signal of the navigation device in accordance with an embodiment of the present invention.

FIG. 4 shows smart card POD module 401, 402 interfaced with an adaptability circuit 500 that adapts the voltage interface signal of navigation device 1 to a required voltage input level of different types of POD modules in accordance with an embodiment of the present invention. As shown in FIG. 4, the adaptability circuit includes pass through signal lines 503 and 505 which deliver unmodified ground and scrambled video from the power supply 27 and tuner/controller 5 respectively to appropriate pins of the POD module 401, 402 which returns unscrambled video out through an appropriate pin to the video circuit 17 via pass through signal line 507 of the adaptability circuit 500. Voltage out from the power supply 27 of the navigation device 1 is input to a programmable voltage regulator circuit which varies the voltage provided to POD module 401, 402 in accordance with a control signal from the tuner/controller 5.

The programmable voltage regulator circuit includes a voltage regulator 510, a digital potentiometer control circuit 515, and a potentiometer 520 controlled by the digital potentiometer circuit 515. The voltage regulator 510 may be a circuit made up of discrete components which in combination regulate an input voltage to a desired output level, but is preferably any one of a variety of commercially available integrated circuit voltage regulators. For example, the voltage regulator 510 may be an LP2951 micropower voltage regulator manufactured by National Semiconductor. The voltage output from the regulator circuit is fed to a resistive network (not shown) which includes a potentiometer 520 that is digitally controlled via the digital potentiometer control circuit 515. The digital potentiometer control circuit 515 is preferably a XDCP X9312W integrated circuit manufactured by Xicor, but may be any suitable digital potentiometer control circuit. A programable voltage regulator using the above specified components provides a wide range computer controlled voltage regulator with a nominal output that varies by 100 equal increments from 1.235 to 14.8 Volts DC other programable voltage regulator circuits may use different components to achieve different voltage ranges as desired.

The programmable voltage regulator of the adaptability circuit 500 inputs an "unregulated" voltage from the power supply 27 and a control signal from tuner/controller 5 of the navigation device 1. The control signal represents the voltage requirement of the POD module that is currently connected to the navigation device 1, and causes the digital potentiometer control circuit 515 to select a value for the potentiometer 520 that will provide a "regulated" output voltage required by the POD module 401,402. How the tuner/controller generates a control signal representative of the required POD module voltage will be described in relation to FIG. 6 below.

Figure 5:
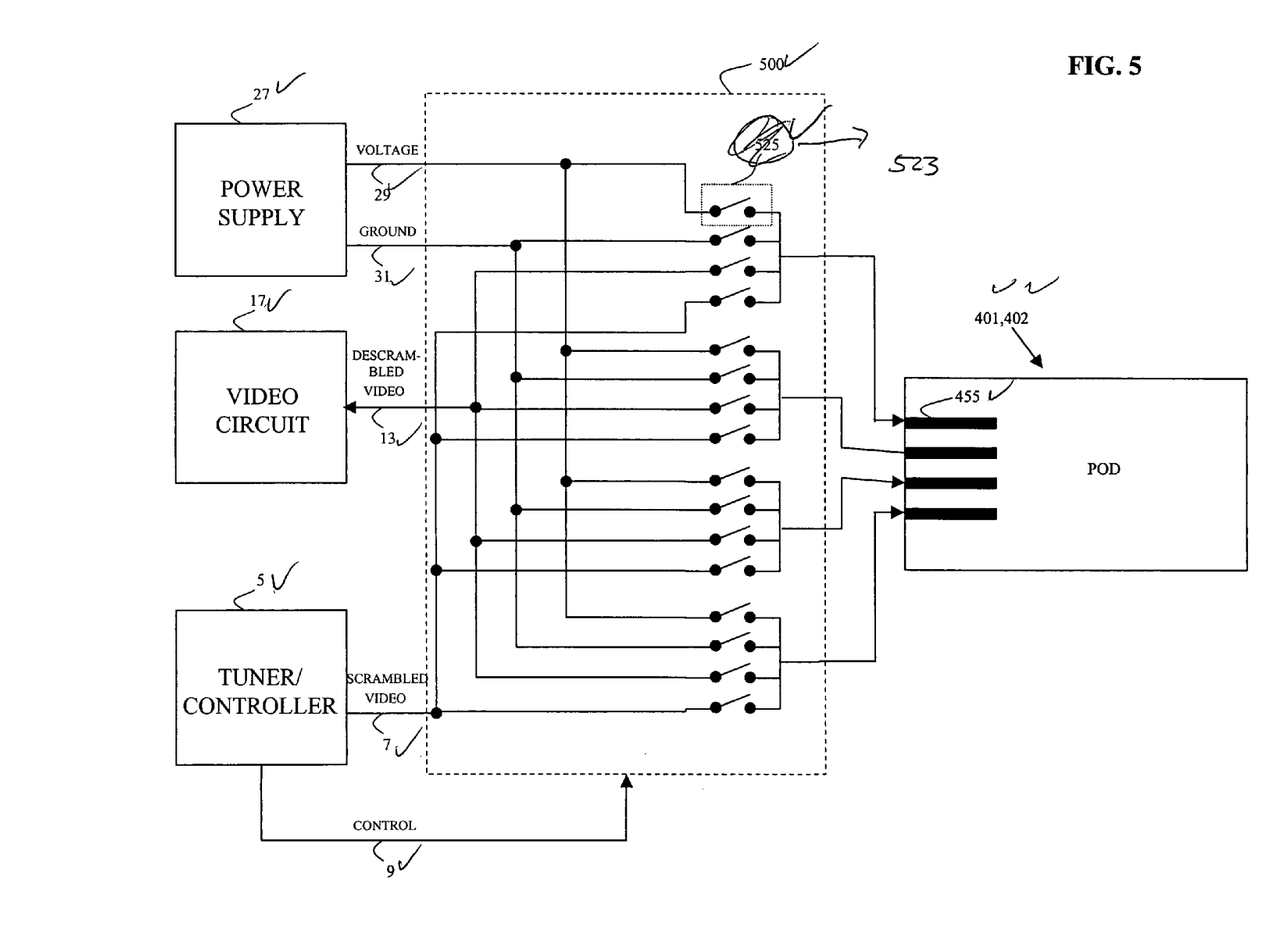
FIG. 5 is an adaptability circuit that adapts interface signals to be applied to particular interface in accordance with an embodiment of the present invention.

FIG. 5 shows smart card POD module 401, 402 interfaced with an adaptability circuit 500 that adapts the ground, voltage, descrambled video, and scrambled video interface signals to be applied to particular pin requirements of different types of POD modules in accordance with an embodiment of the present invention. In this embodiment, the adaptability circuit is a switching unit having a plurality of switched signal lines 523 that route the interface signals to required pins 455 of the POD module in accordance with a control signal from the tuner/controller 5. The control signal enters the switch unit via control line 9 and is representative of the pin location requirements of the POD module 401, 402. How the tuner/controller 5 generates, a control signal representative of the required I/O pins for the interface signals will be discussed with respect to figure below.

The switching unit is made up of an array of switches 525 each of which is opened or closed depending on the control signal on the control line 9. While the control line 9 is shown as a single control line, it is understood by one of ordinary skill in the art that the control line may be a single line that carries serial digital information representative of the various switch states, or a plurality of parallel lines that provide a binary voltage level to individual switches to thereby control the switch. The switches 525 of the switching unit signal of the navigation device can be placed on any one of the I/O pins 455 of the smart card POD module 401, 402. Each switch 525 may be a mechanical relay or an electrical switch such as a bipolar transistor, MOSFET transistor, or any other suitable electrical switch. Moreover, the switching unit 500 may be a combination of interconnected discrete switches, or an integral unit such as an integrated circuit or relay module.

Figure 6:
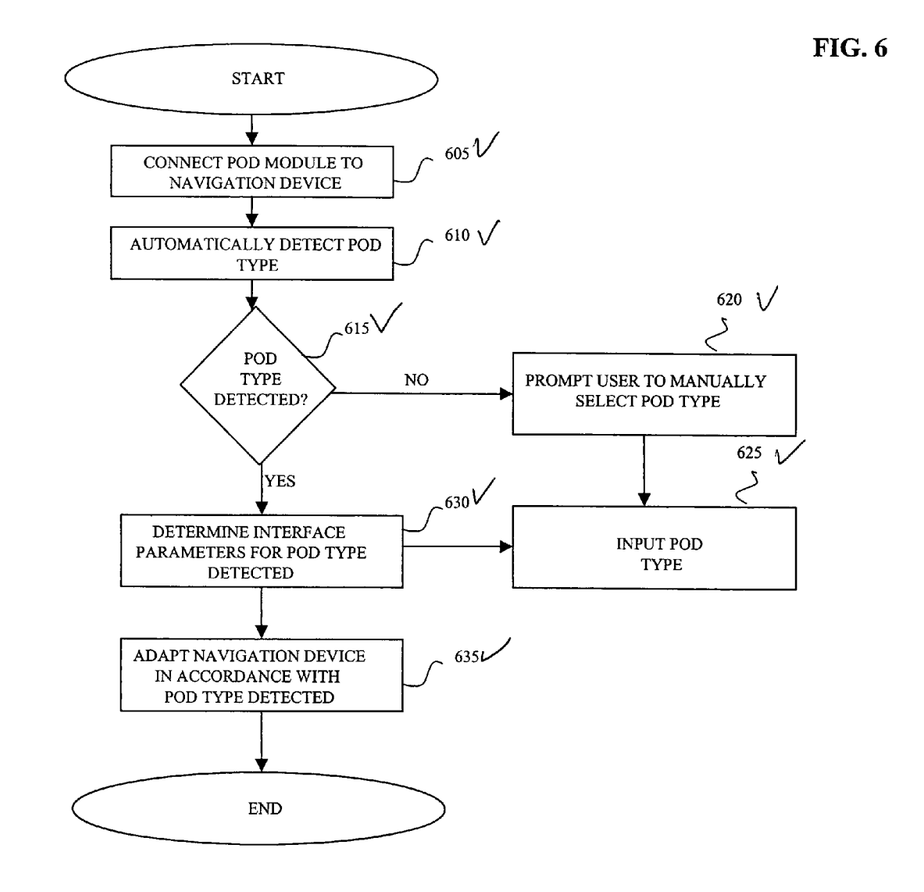
FIG. 6 is a flow chart describing the process for providing adaptability of the navigation device to a plurality of different POD modules in accordance with an embodiment of the present invention.

FIG. 6 is a flow chart describing the process for providing adaptability of the navigation device 1 to a plurality of different POD modules in accordance with an embodiment of the present invention. In step 605, the POD module 40 is connected to the navigation device 1 via adaptability module 50. As previously described, this step may be accomplished by using a cable connection or inserting a smart card POD device into a port of the navigation device 1.

In step 610, navigation device 1 automatically detects a POD type for the POD module connected to the navigation device. In a preferred embodiment, the navigation device receives this information from the input signal received from the signal provider that also issues the POD module 40. Alternatively, the navigation device may receive a type message from the POD module 40 when power is applied to the POD module. In this embodiment, the type message is sent to the navigation device by way of universal pin or contact compatible with all POD modules and navigation devices.

Decision block 615 determines whether the POD type was successfully detected by the navigation device in automatic detection step 610. If the POD type was automatically detected, the navigation device then determines the interface parameters for the POD type detected, in step 630 as will be discussed below. However, if the POD type could not be automatically detected in step 610 either because of a malfunction or because the navigation device 1 is not equipped with auto detection feature 5, the navigation device proceeds to a manual POD type input sequence as shown in steps 620 and 625.

In step 620, the navigation device prompts the user to manually in put the POD type for the POD module 40 interfaced with the navigation device 1. According to one embodiment, the navigation device 1 prompts the user by outputting a signal via video out line 19 to the monitor associated with the navigation device. The video signal may cause a message such as "please input POD type" to be displayed on the monitor, or may cause a menu of POD types from which the user can select to appear on the monitor. The user may determine the POD type by reading information printed on the POD module itself or requesting the information from the cable provider who issued the POD module. Once the POD type information is determined, the user may input the POD type into the navigation device by use of a wireless remote control in a known manner as seen in step 625.

Once the navigation device 1 has obtained the POD type by either automatic or manual means, interface parameters for the POD type detected are than determined as seen in step 630. According to a preferred embodiment, a list of POD types is stored in a memory of the tuner/controller 5. Also stored in the memory are interface parameters associated with each listed POD type. In step 630 a processor of the tuner/controller 5 locates the POD type determined within the list in memory and obtains the interface parameters for that POD type. As discussed, the interface parameters may be a required voltage level input to the POD module, or pin position requirements for interface signals of the POD module. In either case, the processor of the tuner/controller 5 generates a control signal representative of the interface parameters determined. Then in step 635, the digital control signal is sent via control signal line 7 to adaptability circuit 500 which adapts the navigation device to provide the required interface parameters to the POD module interfaced with the navigation device as discussed in FIGS. 4 and 5 above.

Portions of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 7:
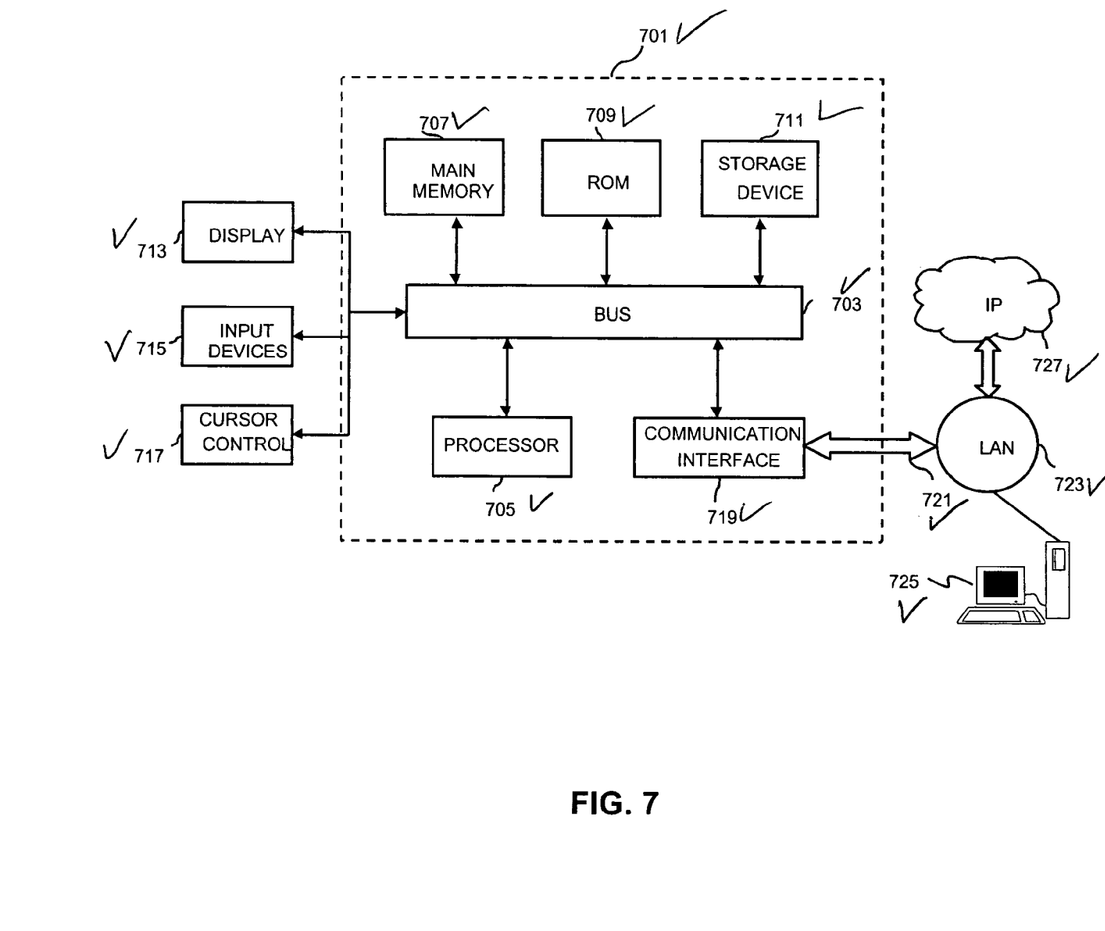
FIG. 7 is a schematic diagram of a computer system that may be used as a substitute for or in conjunction with the navigation device in accordance with the present invention.

FIG. 7 illustrates a computer system 701 upon which in combination with a navigation device an embodiment according to the present invention may be implemented. Computer system 701 includes a bus 703 or other communication mechanism for communicating information, and a processor 705 coupled with bus 703 for processing the information. Computer system 701 also includes a main memory 707, such as a random access memory (RAM) or other dynamic storage device (e.g., dynamic RAM (DRAM), static RAM (SRAM), synchronous DRAM (SDRAM), flash RAM), coupled to bus 703 for storing information and instructions to be executed by processor 705. In addition, main memory 707 may be used for storing temporary variables or other intermediate information during execution of instructions to be executed by processor 705. Computer system 701 further includes a read only memory (ROM) 709 or other static storage device (e.g., programmable ROM (PROM), erasable PROM (EPROM), and electrically erasable PROM (EEPROM)) coupled to bus 703 for storing static information and instructions for processor 705. A storage device 711, such as a magnetic disk or optical disc, is provided and coupled to bus 703 for storing information and instructions.

The computer system 701 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 701 using an appropriate device bus (e.g., a small computer system interface (SCSI) bus, an enhanced integrated device electronics (IDE) bus, or an ultra-direct memory access (DMA) bus). The computer system 701 may additionally include a compact disc reader, a compact disc reader-writer unit, or a compact disc juke box, each of which may be connected to the same device bus or another device bus.

Computer system 701 may be coupled via bus 703 to a display 713, such as a cathode ray tube (CRT), for displaying information to a computer user. The display 713 may be controlled by a display or graphics card. The computer system includes input devices, such as a keyboard 715 and a cursor control 717, for communicating information and command selections to processor 705. The cursor control 717, for example, is a mouse, a trackball, or cursor direction keys for communicating direction information and command selections to processor 705 and for controlling cursor movement on the display 713. In addition, a printer may provide printed listings of any data stored and/or generated by the computer system 701.

The computer system 701 performs a portion or all of the processing steps of the invention in response to processor 705 executing one or more sequences of one or more instructions contained in a memory, such as the main memory 707. Such instructions may be read into the main memory 707 from another computer-readable medium, such as storage device 711. One or more processors in a multi-processing arrangement may also be employed to execute the sequences of instructions contained in main memory 707. In alternative embodiments, hard-wired circuitry may be used in place of or in combination with software instructions. Thus, embodiments are not limited to any specific combination of hardware circuitry and software.

As stated above, the system 701 includes at least one computer readable medium or memory programmed according to the teachings of the invention and for containing data structures, tables, records, or other data described herein. Stored on any one or on a combination of computer readable media, the present invention includes software for controlling the computer system 701, for driving a device or devices for implementing the invention, and for enabling the computer system 701 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 705 for execution. A computer readable medium may take many forms, including but not limited to, non-volatile media, volatile media, and transmission media. Non-volatile media includes, for example, optical, magnetic disks, and magneto-optical disks, such as storage device 711. Volatile media includes dynamic memory, such as main memory 707. Transmission media includes coaxial cables, copper wire and fiber optics, including the wires that comprise bus 703. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 705 for execution. For example, the instructions may initially be carried on a magnetic disk of a remote computer. The remote computer can load the instructions for implementing all or a portion of the present invention remotely into a dynamic memory and send the instructions over a telephone line using a modem or over a cable signal line. A modem local to computer system 701 may receive the data on the telephone or cable line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network (e.g., LAN 723) or cable network. For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding telephone line. Wireless links may also be implemented. In any such implementation, communication interface 719 sends and receives electrical, electromagnetic or optical signals that carry digital data streams representing various types of information.

Network link 721 typically provides data communication through one or more networks to other data devices. For example, network link 721 may provide a connection through LAN 723 to a host computer 725 or to data equipment operated by a service provider, which provides data communication services through an IP (Internet Protocol) network 727. LAN 723 and IP network 727 both use electrical, electromagnetic or optical signals that carry digital data streams. The signals through the various networks and the signals on network link 721 and through communication interface 719, which carry the digital data to and from computer system 701, are exemplary forms of carrier waves transporting the information. Computer system 701 can transmit notifications and receive data, including program code, through the network(s), network link 721 and communication interface 719.

Obviously, numerous modifications and variations of the present invention are possible in light of the above teachings. It is therefore to be understood that within the scope of the appended claims, the invention may be practiced otherwise than as specifically described herein.

What is claimed is:

1. A method for adapting a multichannel video receiver to operate with a plurality of different point of deployment (POD) modules that provide conditional access to video programming, comprising:
   determining a POD type for a POD module that is interfaced with said mutichannel video receiver;
   determining interface parameters for said POD type determined; and
   adapting said multichannel video receiver to provide said interface parameters to said POD module interfaced with said multichannel video receiver;
   wherein said step of determining a POD type comprises:
   prompting a user of said multichannel video receiver to determine and input the POD type for the POD module interfaced with said multichannel video receiver;
   receiving a user input command representative of the POD type; and
   determining the POD type based on said user input command.

2. The method of claim 1, wherein said step of prompting a user of said multichannel video receiver to input the POD type comprises displaying an on-screen message on a video monitor associated with said multichannel video receiver, and
   said step of receiving a user input command representative of the POD type comprises receiving a wireless signal from a remote controller operable by the user and associated with said multichannel video receiver.

3. A method for adapting a multichannel video receiver to operate with a plurality of different point of deployment (POD) modules that provide conditional access to video programming, comprising:
   determining a POD type for a POD module that is interfaced with said mutichannel video receiver;
   determining interface parameters for said POD type determined; and
   adapting said multichannel video receiver to provide said interface parameters to said POD module interfaced with said multichannel video receiver;
   wherein said step of determining interface parameters for the POD type determined comprises obtaining said interface parameters from a memory file containing a list of POD types corresponding to said plurality of POD modules, and predetermined interface parameters associated with each POD type.

4. The method of claim 3, wherein said interface parameter determined comprises a voltage level input required by said POD type, and said step of adapting said multichannel video receiver to provide said interface parameters to said POD module comprises providing said voltage level input to said POD module interfaced with said multichannel video receiver.

5. The method of claim 4, wherein said step of providing said voltage level input to said POD module comprises:
   providing a programmable voltage regulator configured to input an unregulated voltage from said multichannel video receiver and to output a regulated voltage to said POD module; and
   sending a control signal to said programmable voltage regulator, said control signal causing said programmable voltage regulator to output said voltage level input required by said POD type.

6. The method of claim 4, wherein said interface parameter determined comprises pin positions of different interface signals required by said POD type, and said step of adapting said multichannel video receiver to provide said interface parameters to said POD module comprises providing said interface signals to pin positions of said POD module interfaced with said multichannel video receiver, said pin positions of said POD module corresponding to said pin positions required by said POD type.

7. The method of claim 6 wherein said step of providing said interface signals to said pin positions of said POD module comprises:
   providing a programmable switching unit configured route said interface signals between said multichannel video receiver said POD module; and
   sending a control signal to said switching unit, said control signal causing said switching unit to route said interface signals to said pin positions of said POD module corresponding to said pin positions required by said POD type.

8. The method of claim 7, wherein said interface signals comprise a video in, a voltage in, and a ground in from said multichannel video receiver, and a video out from said POD module.

9. An apparatus for adapting a multichannel video receiver to operate with a plurality of different point of deployment (POD) modules that provide conditional access to video programming, comprising:
   a memory having embedded therein data related to adapting said multichannel video receiver to operate with a plurality of different POD modules;
   a processor configured to:
   determine a POD type for a POD module interfaced with said multichannel video receiver, and to determine interface parameters for said POD type determined; and
   an adaptability circuit configured to adapt said multichannel video receiver to provide said interface parameters to said POD module interfaced with said multichannel video receiver,
   wherein said processor is configured to determine a POD type for a POD module interfaced with said multichannel video receiver by:
   prompting a user of said multichannel video receiver to determine and input the POD type for the POD module interfaced with said multichannel video receiver;
   receiving a user input command representative of the POD type; and
   determining the POD type based on said user input command.

10. The apparatus of claim 9, wherein said processor is configured to prompt a user of said multichannel video receiver to input the POD type by causing an on-screen message to be displayed on a video monitor associated with said multichannel video receiver, and
   to receive a user input command representative of the POD type by receiving a wireless signal from a remote controller operable by the user and associated with said multichannel video receiver.

11. An apparatus for adapting a multichannel video receiver to operate with a plurality of different point of deployment (POD) modules that provide conditional access to video programming, comprising:
   a memory having embedded therein data related to adapting said multichannel video receiver to operate with a plurality of different POD modules;
   a processor configured to:
   determine a POD type for a POD module interfaced with said multichannel video receiver, and to determine interface parameters for said POD type determined; and
   an adaptability circuit configured to adapt said multichannel video receiver to provide said interface parameters to said POD module interfaced with said multichannel video receiver,
   wherein said processor determines said interface parameters for the POD type determined by obtaining said interface parameters from a file embedded in said memory, said file including a list of POD types corresponding to said plurality of POD modules, and predetermined interface parameters associated with associated with each POD type.

12. The apparatus of claim 11, wherein said interface parameters determined comprise a voltage level input required by said POD type, and said adaptability circuit is configured to adapt said mutichannel video receiver to provide said required voltage level input to said POD module interfaced with said multichannel video receiver.

13. The apparatus of claim 12, wherein said adaptability circuit comprises a programmable voltage regulator configured to input an unregulated voltage from said multichannel video receiver and to output a regulated voltage to said POD module; and
   said processor is configured to send a control signal to said programmable voltage regulator, said control signal causing said programmable voltage regulator to output said voltage level input required by said POD type.

14. The apparatus of claim 11, wherein said interface parameters determined comprise pin positions of different interface signals required by said POD type, and said adaptability circuit is configured to adapt said multichannel video receiver to provide said interface signals to pin positions of said POD module corresponding to said pin positions required by said POD type.

15. The apparatus of claim 14, wherein said adaptability circuit comprises a programmable switching unit configured to route said interface signals between said multichannel video receiver and said POD module; and
   said processor is configured to send a control signal to said switching unit, said control signal causing said switching unit to route said interface signals to said pin positions of said POD module corresponding to said pin positions required by said POD type.

16. The apparatus of claim 15, wherein said switching unit comprises an array of mechanical relays that are selectively opened or closed to route said interface signals to said pin position of said POD module in response to said control signal.

17. The apparatus of claim 15, wherein said switching unit comprises an array of electrical switches that are selectively opened or closed to route said interface signals to said pin positions of said POD module in response to said control signal.

18. An apparatus for adapting a multichannel video receiver to operate with a plurality of different point of deployment (POD) modules that provide conditional access to video programming, comprising:
- a memory having embedded therein data related to adapting said multichannel video receiver to operate with a plurality of different POD modules;
- a processor configured to:
- determine a POD type for a POD module interfaced with said multichannel video receiver, and to determine interface parameters for said POD type determined; and
- an adaptability circuit configured to adapt said multichannel video receiver to provide said interface parameters to said POD module interfaced with said multichannel video receiver;

wherein said interface signals comprise a video in, a voltage in, and a ground in from said multichannel video receiver, and a video out signal from said POD security module.

19. An apparatus for adapting a multichannel video receiver to operate with a plurality of different point of deployment (POD) modules that provide conditional access to video programming, comprising:
- a memory having embedded therein data related to adapting said multichannel video receiver to operate with a plurality of different POD modules;
- a processor configured to:
- determine a POD type for a POD module interfaced with said multichannel video receiver, and to determine interface parameters for said POD type determined; and
- an adaptability circuit configured to adapt said multichannel video receiver to provide said interface parameters to said POD module interfaced with said multichannel video receiver;

further comprising an adaptability input/output portion configured to mate with and provide electrical contact with an input/output portion of said POD module when said POD module is interfaced with said multichannel video receiver wherein said adaptability input/output portion comprises a cable connector configured to mate with a cable connected to each of said POD modules.

* * * * *